United States Patent
Liu et al.

(10) Patent No.: US 7,021,159 B2
(45) Date of Patent: Apr. 4, 2006

(54) TRANSDUCER

(75) Inventors: Keming Liu, Sterling Height, MI (US); Jing Yuan, Rochester Hills, MI (US); Imtiaz Ali, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/262,035

(22) Filed: Sep. 30, 2002

(65) Prior Publication Data

US 2004/0060369 A1    Apr. 1, 2004

(51) Int. Cl.
*G01L 1/22*    (2006.01)

(52) U.S. Cl. .................................. 73/862.045

(58) Field of Classification Search ..............
73/862.041–862.045, 862
See application file for complete search history.

(56) References Cited

U.S. PATENT DOCUMENTS

| | | | |
|---|---|---|---|
| 3,902,363 A * | 9/1975 | Ishimoto ....................... 73/159 |
| 4,015,468 A | 4/1977 | Simon ........................... 73/136 |
| 4,281,539 A | 8/1981 | Keller ...................... 73/862.54 |
| 4,326,424 A | 4/1982 | Koenig .................... 73/862.48 |
| 4,581,947 A | 4/1986 | Wulf et al. .............. 73/862.48 |
| 4,691,579 A | 9/1987 | Ekola ...................... 73/862.48 |
| 4,735,102 A | 4/1988 | Koenig .................... 73/862.48 |
| 4,784,004 A | 11/1988 | Ekola ...................... 73/862.48 |
| 4,796,474 A | 1/1989 | Koenig .................... 73/862.65 |
| 4,821,583 A | 4/1989 | Richards .................. 73/862.48 |
| 4,899,599 A | 2/1990 | Eddens .................... 73/862.48 |
| 5,113,709 A | 5/1992 | Ekola ...................... 73/862.48 |
| 5,313,828 A * | 5/1994 | Kotzle et al. ................. 73/146 |
| 5,894,094 A * | 4/1999 | Kuchler et al. ........ 73/862.044 |
| 5,905,212 A * | 5/1999 | Moses et al. .......... 73/862.451 |
| 6,038,933 A * | 3/2000 | Meyer ................... 73/862.045 |
| 6,216,547 B1 | 4/2001 | Lehtovaara ............ 73/862.391 |
| 6,324,919 B1 * | 12/2001 | Larsen et al. .......... 73/862.043 |
| 6,360,616 B1 | 3/2002 | Halliday et al. ......... 73/862.49 |
| 6,484,593 B1 | 11/2002 | Lehtovaara ............ 73/862.637 |

FOREIGN PATENT DOCUMENTS

DE    3603187 A1    6/1987

* cited by examiner

*Primary Examiner*—Max Noori
(74) *Attorney, Agent, or Firm*—J. A. Thurnau, Esq.; C. H. Castleman, Esq.; J. L. Mahurin, Esq.

(57) ABSTRACT

A transducer for detecting a shaft dynamic behavior. The transducer comprises an arcuate sensor member supported between an inner member and an outer member. At least one strain gage is attached to a surface of the arcuate sensor member to detect a surface strain caused by a shaft dynamic behavior. The inner member, outer member and arcuate sensor member are substantially coplanar. The inner member comprises a means for attaching the transducer to a mounting surface. The inner member may also comprise a self-aligning feature to optimize a sensor sensitivity.

6 Claims, 4 Drawing Sheets

TRANSDUCER

FIELD OF THE INVENTION

The invention relates to a transducer, and more particularly to a transducer for measuring a shaft dynamic behavior having concentric members supporting an arcuate sensor member between them.

BACKGROUND OF THE INVENTION

Various strain measuring devices are known. Among the known devices are dual beam sensing members which include spaced end wall members connected integrally by parallel spaced beam members, which beam members are relatively flexible or bendable in one direction only. One of the end walls is generally attached to a support structure and the other end wall is operatively or directly attached to a shaft.

Other devices are known which provide a cantilever connection between a shaft member and a load sensor device. The cantilever nature of the connection serves to increase a width or thickness of the device, thereby increasing the space necessary to accommodate the device.

Representative of the art is U.S. Pat. No. 4,899,599 to Eddens (1990) which discloses a strain sensor device for measuring tension on a web or strand member including a frame member, a shaft member extending from the frame member and having a web or strand engaging member mounted thereon, the strain sensor device supporting one portion of the shaft on the frame member.

The prior art transducers are not compact nor can they be used as an integral part of a system pulley.

What is needed is a transducer that comprises concentric and coplanar members supporting an arcuate sensor member disposed between them. What is needed is a transducer that can be contained within a pulley. What is needed is a transducer that comprises concentric and coplanar members supporting an arcuate sensor member disposed between them and having a load self-aligning feature. The present invention meets these needs.

SUMMARY OF THE INVENTION

The primary aspect of the invention is to provide a transducer that comprises concentric and coplanar members supporting an arcuate sensor member disposed between them.

Another aspect of the invention is to provide a transducer that can be contained within a pulley.

Another aspect of the invention is to provide a transducer that comprises concentric and coplanar members supporting an arcuate sensor member disposed between them and having a load self-aligning feature.

Other aspects of the invention will be pointed out or made obvious by the following description of the invention and the accompanying drawings.

The invention comprises a transducer for detecting a shaft dynamic behavior. The transducer comprises an arcuate sensor member supported between an inner member and an outer member. At least one strain gage is attached to a surface of the arcuate sensor member to detect a surface strain caused by a shaft dynamic behavior. The inner member, outer member and arcuate sensor member are substantially coplanar. The inner member comprises a means for attaching the transducer to a mounting surface. The inner member may also comprise a self-aligning feature to optimize a sensor sensitivity.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
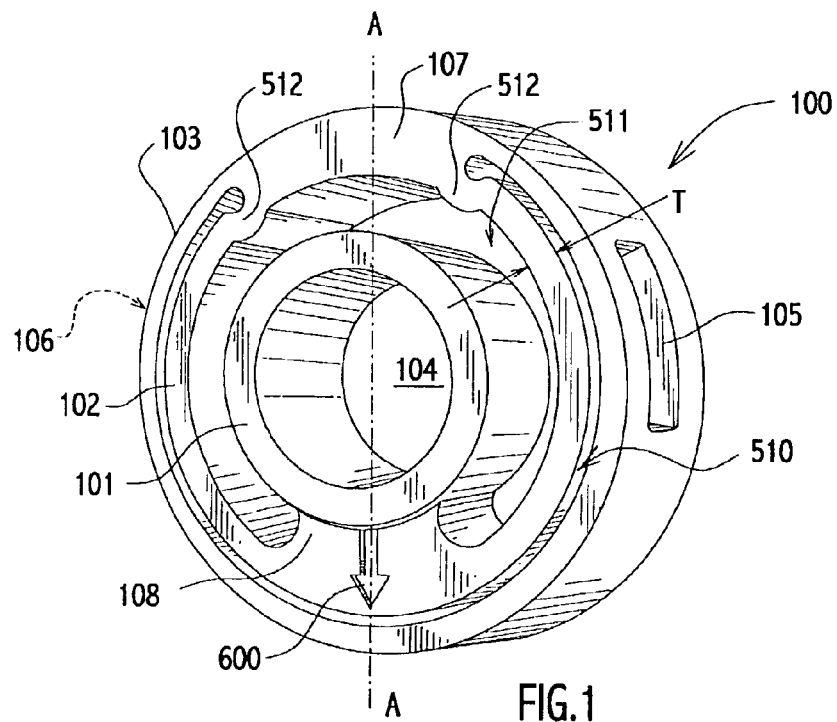
FIG. 1 is a perspective view of the transducer.

FIG. 1 is a perspective view of the transducer. The transducer is relatively compact and may be used in a pulley to measure a shaft load or shaft dynamic behavior. This includes measuring a hubload and thereby a belt tension. A hubload is a load imparted to a pulley and its shaft by a belt tension in a belt drive system. The transducer may also be used to measure a shaft vibration.

Transducer 100 generally comprises an arcuate inner member or hub ring 101, sensor ring 102 and arcuate outer member or outer ring 103. Hub ring 101 comprises a bore 104 which acts as a means for attaching the transducer to a mounting surface. A fastener such as a bolt engages hub ring 101 through bore 104 to connect the transducer to a mounting surface. Hub ring 101 is relatively rigid to provide a firm means of connecting the transducer to a mounting surface. Hub ring 101 may also comprise an integral shaft for attaching the hub ring to a mounting surface. Hub ring 101 is connected to sensor ring 102 by connecting portion or member 108.

Sensor ring 102 is connected between hub ring 101 and outer ring 103. Sensor ring 102 has an arcuate shape which concentrically cooperates with the arcuate shape of hub ring 101 and outer ring 103. The concentric relationship between the hub ring, sensor ring and outer ring allows the inventive transducer to have a minimal diameter for better use in confined areas, such as in a pulley.

Slot 510 is disposed between sensor ring 102 and outer ring 103. Slot 511 is disposed between sensor ring 102 and inner ring 101. Under load sensor ring 102 deforms to become elongated or elliptically shaped, having a major axis in direction A—A and a minor axis in direction B—B, see FIG. 3. A width of slot 511 is determined by a desired total deformation of sensor ring 102 in direction B—B when under load. A width of slot 511 is also a function of the thickness T of sensor ring 102. Thickness T is determined by the dynamic conditions to which the sensor ring is exposed.

Figure 3:
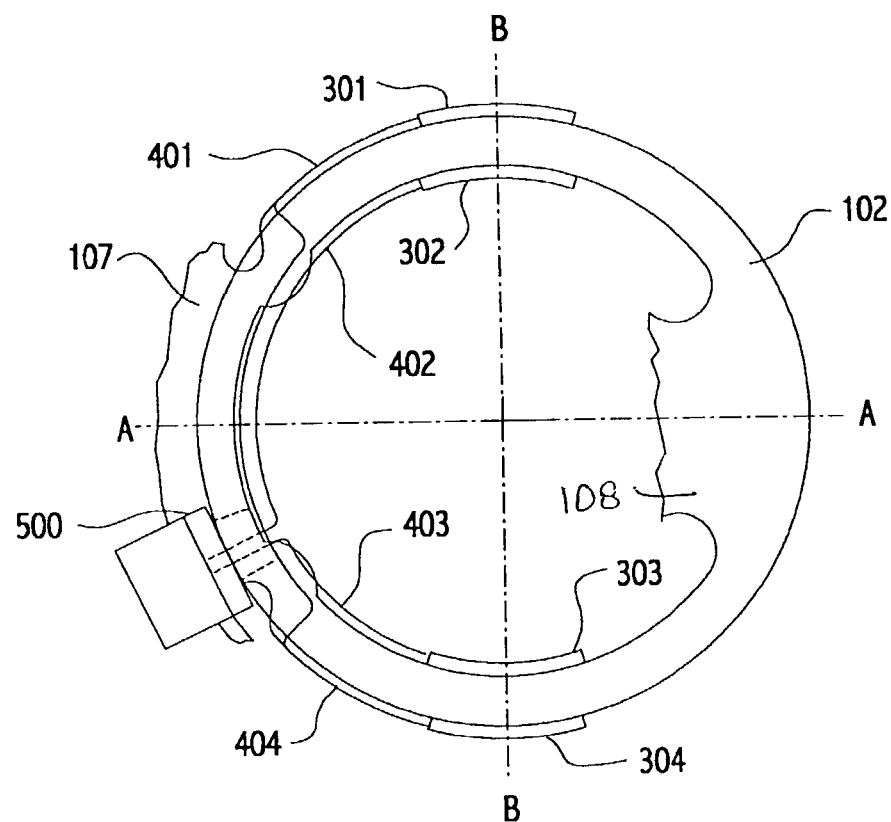
FIG. 3 is a plan view of the transducer sensor ring.

At least one strain gage is attached to the sensor ring as described in FIG. 3. A hubload force vector is represented by vector 600. Sensor ring 102 is sufficiently flexible to cause a surface strain to be realized at a strain gage location upon application of a hubload to the hub ring. Sensor ring 102 is connected through arcuate connecting members 512 to outer ring 103 and portion 107. Portion 107 and connecting member 108 are disposed on substantially opposing sides of sensor ring 102. Connecting sensor ring 102 to outer ring 103 at members 512 enhances a deformation of sensor ring 102, and therefore enhances surface strains in sensor ring 102 when subjected to a hubload force 600 along axis A—A. Although vector 600 is showing having a particular direction, the transducer is capable of detecting loads having vectors in any direction. Of course, an overall sensitivity may be affected depending upon the spatial relationship between vector 600 and the strain gage(s) position with respect thereto.

Each member 512 partially deforms in conjunction with sensor ring 102 when the transducer is under load. Members 512 have a predetermined spring rate that is a function of the dynamic loading to be borne by the transducer, and more particularly, by sensor ring 102. The predetermined spring rate in turn determines an arcuate form of each member 512.

One can appreciate that during operation sensor ring 102 will be constantly subjected to vibrations and cyclic loading. This will in turn impose stresses on the connection between sensor ring 102 and outer ring 103. Hence, the arcuate form of members 512 enhances a transducer operating life by distributing and dispersing, thereby reducing, stress risers that might otherwise be present at a connection between the sensor ring 102 and the outer ring 103. This, in turn, minimizes potential fatigue cracking that may otherwise be caused by stress risers at the connection.

Apertures 105, 106 in outer ring 103 are used to facilitate installation of strain gages 301 and 304 on sensor ring 102, see FIG. 3.

Bracket 500 may be used to accept a strain-gage signal conditioner. Bracket 500 is attached to outer ring 103. Bracket may be formed or cast as an integral part of outer ring 103 as well.

Outer ring 103 provides structural strength to the device as well as provides a means for engaging the transducer to a bearing and pulley. Outer ring 103 is press fit into a pulley bearing, which bearing is in turn engaged with a pulley for engaging a belt. Outer ring 103 is sufficiently rigid to permit rotational operation of a pulley about the transducer in a belt drive system.

Hub ring 101, sensor ring 102, and outer ring 103 are substantially coplanar. More particularly, each of the rings is concentrically nested within the other. Nesting the rings reduces a thickness of the inventive device to a minimum, thereby allowing use of the transducer in a pulley, for example, in an existing vehicle front end accessory drive where equipment space may be confined. The inventive transducer can be used to replace an existing pulley in a belt drive system, thus allowing retrofit for instrument installation with little or no modification to an existing system. The transducer may also be used in a tensioner between a tensioner pulley and tensioner arm on a tensioner pulley shaft in order to measure a shaft dynamic behavior or a tensioner arm dynamic behavior.

In the preferred embodiment the inventive transducer can be machined from a single piece of material, such as metal. The device may also be cast from a suitable material such as plastic or ceramic depending upon the load to be born by the transducer.

Figure 4A:
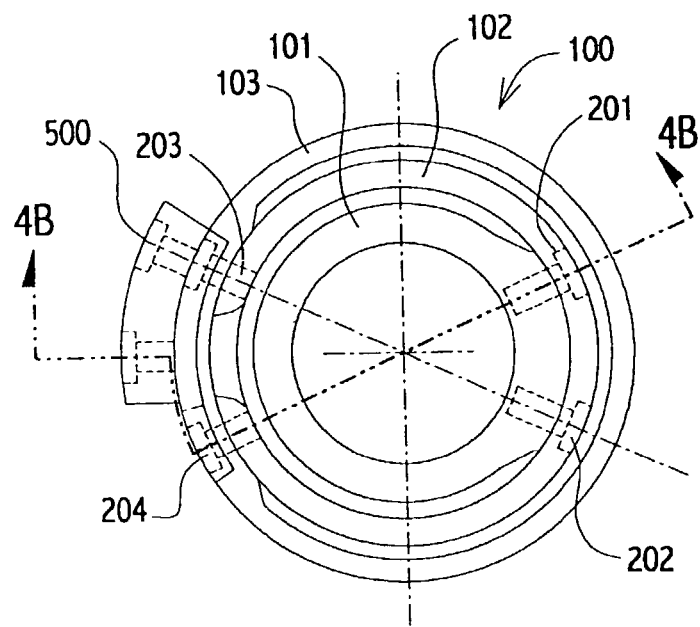
FIG. 4A is a plan view of the transducer.

In another embodiment, it may comprise three pieces, i.e., hub ring, sensor ring, and outer ring joined by adhesives or screws, see FIG. 4a. In an embodiment, the hub ring and the outer ring comprise a ceramic material and the sensor ring comprises a metallic material. In yet another embodiment the hub ring and the outer ring may comprise a plastic material in particularly low load applications. The plastic need only have a sufficient modulus and have a sufficient resistance to the operating temperature of the engine to which it is mounted.

In yet another embodiment, the sensor ring and the outer ring comprise a single machined piece, with the hub ring attached by screws or adhesives to the sensor ring. In this embodiment the sensor ring and outer ring may comprise a metallic material and the hub ring may comprise a ceramic material. The hub ring may also comprise a plastic material in a relatively low load application. The plastic need only have a sufficient modulus and have a sufficient resistance to the operating temperature of the engine to which it is mounted.

Figure 2:
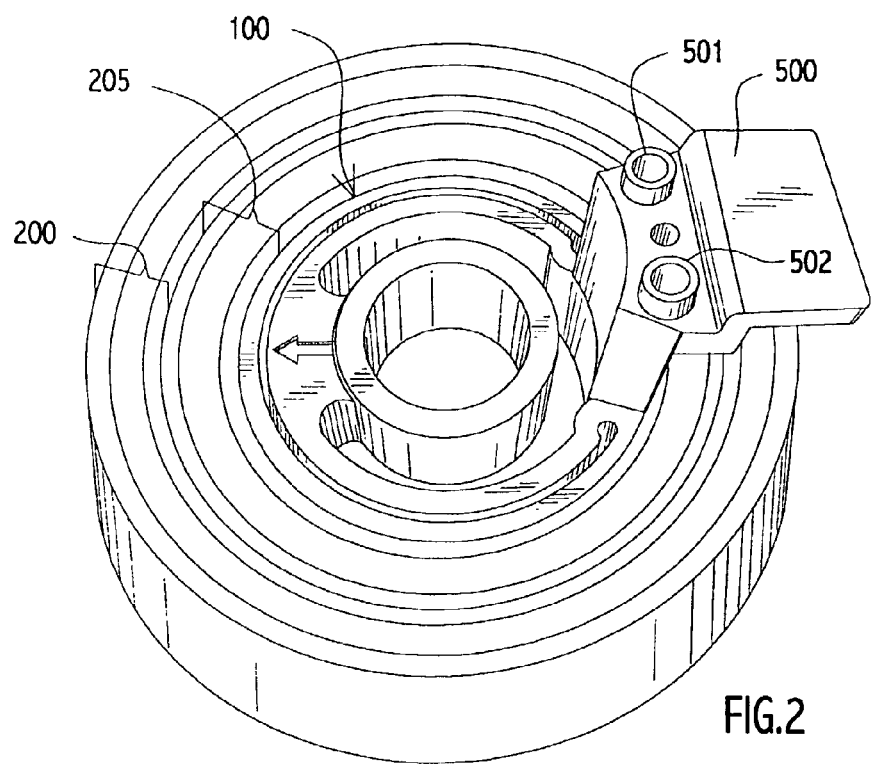
FIG. 2 is a perspective view of the transducer.

FIG. 2 is a perspective view of the transducer. Transducer 100 is shown contained within a pulley 200. A bearing or bearings 205 are pressed onto the outside of outer ring 103 to occupy an annular space between outer ring 103 and pulley 200. Bracket 500 is attached to transducer 100 with fasteners 501, 502.

FIG. 3 is a plan view of the transducer sensor ring. Sensor ring 102 is shown with strain gages 301, 302, 303, 304 mounted thereto in a full bridge configuration. As such the strain gages are connected by wires 401, 402, 403, 404. Wires 402 and 403 are routed to bracket 500 for connection to an instrument lead wire. Strain gages 301 and 304 may be attached to sensor ring 102 through apertures 105 and 106. The strain gages are oriented so that a force vector axis A—A is perpendicular to an imaginary line B—B between the strain gages.

FIG. 4A is a plan view of the transducer. This is the embodiment using a separate hub ring 101, sensor ring 102 and outer ring 103 as described elsewhere herein. Sensor ring 102 is fastened to outer ring 103 using screws 203 and 204. Hub ring 101 is fastened to sensor ring 102 using screws 201 and 202. Other means of fastening the rings may comprise welding, adhesives, riveting, or other appropriate means known in the art. Screws 201, 202, 203, 204 are oriented as shown with respect to a hubload axis A—A.

Figure 4B:
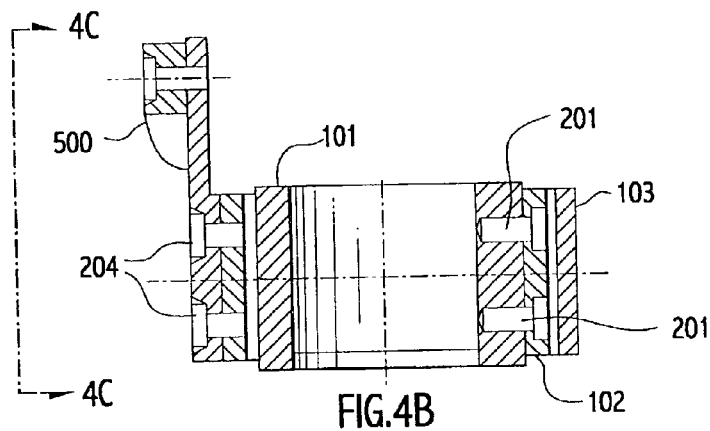
FIG. 4B is a cross-sectional view of FIG. 4A at line B—B.

FIG. 4B is a cross-sectional view of FIG. 4A at line 4B—4B. Screws 201 and 204 are shown connecting sensor ring 102 to outer ring 103. Bracket 500 provides a means to connect the strain gage wires to an instrument lead wire as described elsewhere herein.

Figure 4C:
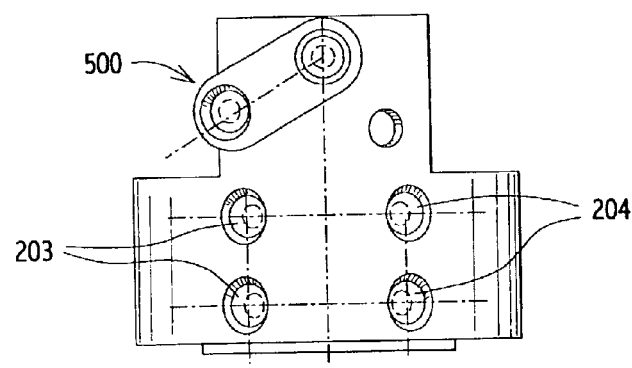
FIG. 4C is a side view at 4C—4C in FIG. 4B.

FIG. 4C is a side view at 4C—4C in FIG. 4B. Screws 203 and 204 are shown connecting outer ring 103 to sensor ring 102.

Figure 5:
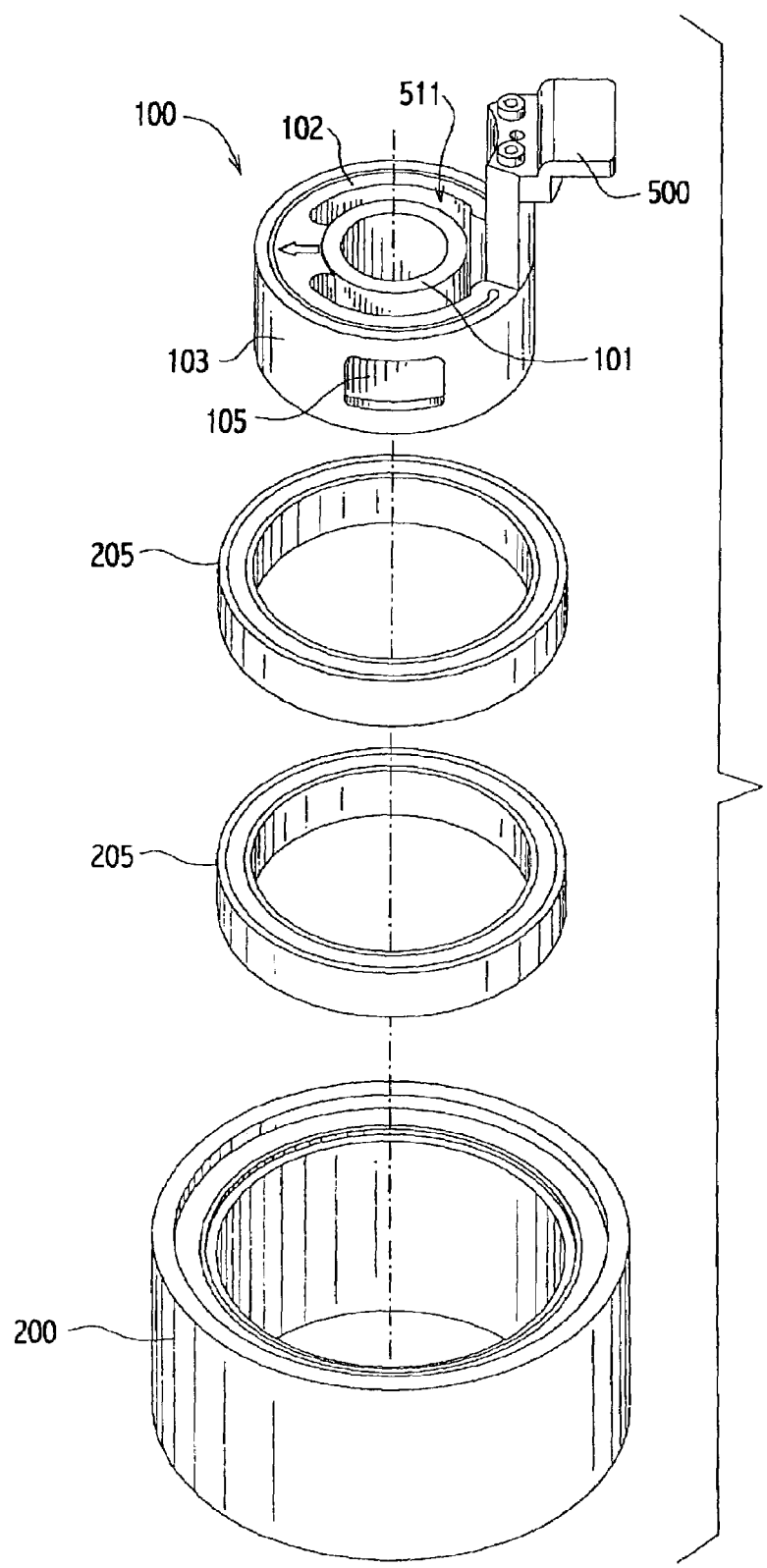
FIG. 5 is a perspective exploded view of the transducer.

FIG. 5 is a perspective exploded view of the transducer. Bearings 205 are pressed on outer ring 103 of transducer 100. Pulley 200 is pressed onto bearings 205.

Figures 6, 7:
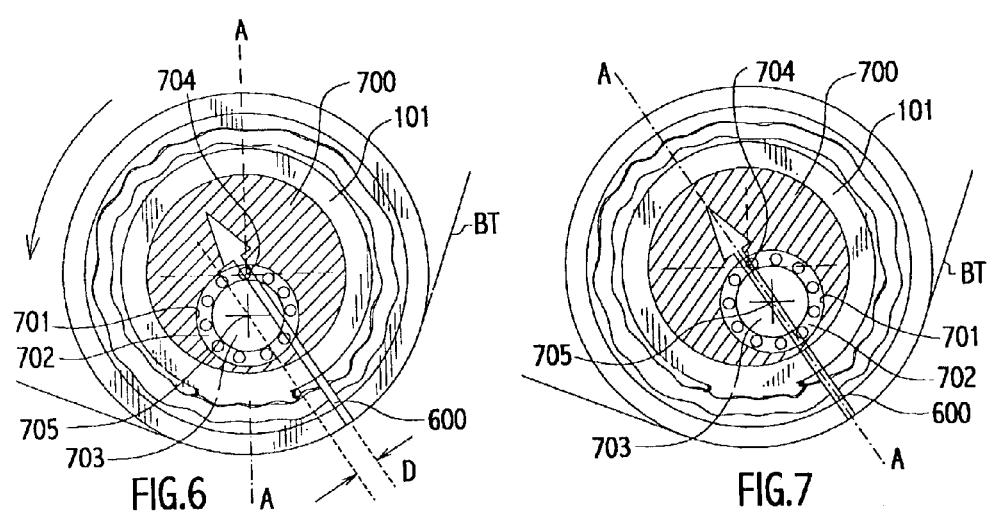
FIG. 6 is a partial plan view of the self-aligning portion.
FIG. 7 is a partial plan view of the self-aligning portion.

FIG. 6 is a partial plan view of the self-aligning portion. In order to optimize a sensitivity of the transducer, it is desirable that the sensor ring be disposed to the hubload vector 600 such that vector 600 aligns with axis A—A, thereby aligning the strain gages with an axis B—B, see FIG. 3. This can be accomplished using a self-aligning member 700.

More particularly, an eccentric self-aligning member 700 is disposed in inner ring bore 104. By way of example and not of limitation, eccentric member 700 is press fit into bore 104. One can also appreciate that member 700 may also simply comprise an integral part of arcuate inner member 101, namely, arcuate inner member comprises a bore 701 having a center 705 which is not aligned with a transducer geometric center.

Eccentric member 700 comprises a bore 701. Center 705 of bore 701 is eccentrically disposed a distance from an eccentric member geometric center 704. Eccentric member geometric center 704 also coincides with a transducer geometric center and sensor ring geometric center. Bearing 702 is pressed into bore 701. A fastening member 703, such as a bolt, projects through and attaches bearing 702, and thereby the transducer, to a mounting surface (not shown). By action of bearing 702 the transducer is freely rotatable about fastening member 703.

In an exemplary situation, a hubload vector 600 is shown acting upon the transducer. The hubload is caused by a belt BT having a tension. In the exemplary configuration vector 600 is initially laterally offset from bore center 705 by a distance (D). Immediately upon application of a hubload 600, the self-aligning feature of member 700 operates to properly align the transducer. More particularly, distance (D) acts as a lever arm which causes a torque to be applied to eccentric member 700. The torque causes eccentric member 700, and thereby transducer 100 and sensor ring 102, to rotate about bearing 702 until vector 600 aligns with center 705, thereby eliminating the self-aligning torque and restoring equilibrium. This manner of operation of self-alignment applies regardless of the direction of vector 600.

FIG. 7 is a partial plan view of the self-aligning portion. Vector 600 is aligned with bore center 705. This orientation results in strain gages 301, 302, 303, 304 being in an optimum sensing position, that is, aligned with axis B—B as described in FIG. 3.

One can appreciate that the transducer can operate with or without the self-aligning member 700 as described in FIGS. 6 and 7. Use of the self-aligning member 700 depends upon a desired sensitivity for the transducer. This may also depend in part upon a range of movement of vector 600 during operation. The sensitivity of the transducer is a function of the alignment of the strain gage(s) with a load vector 600. For example, if the inventive transducer is used with an idler with a narrow range of directions for vector 600, the need for the self-aligning member may be less important. In the alternative, where the transducer is used on a tensioner having a relatively large range of movement caused by a tensioner arm movement, use of the self-aligning member is advantageous to maintain a desired sensitivity for the transducer.

Although forms of the invention have been described herein, it will be obvious to those skilled in the art that variations may be made in the construction and relation of parts without departing from the spirit and scope of the invention described herein.

We claim:

1. A sensor comprising;
   an arcuate outer member;
   an arcuate inner member;
   an arcuate sensor member for sensing a strain;
   the arcuate sensor member connected between the arcuate outer member and the arcuate inner member;
   at least one strain gage disposed on a surface of the arcuate sensor member;
   the arcuate outer member and the arcuate inner member are coplanar; and
   the arcuate inner member comprising a bore offset from a sensor center, the sensor thereby eccentrically rotatable about the sensor center.

2. The sensor as in claim 1 wherein the arcuate sensor member and the arcuate outer member and the arcuate inner member are coplanar.

3. The sensor as in claim 1 wherein the arcuate inner member describes a bore.

4. The sensor as in claim 1 wherein the arcuate outer member and the arcuate inner member are concentric.

5. The sensor as in claim 1 further comprising an arcuate connecting member between the arcuate sensor ring and the arcuate outer ring.

6. The sensor as in claim 1 further comprising a bearing disposed in the offset bore for engaging a fastener.

* * * * *